Patented Mar. 22, 1938

2,111,828

UNITED STATES PATENT OFFICE 2,111,828

COMPRESSION-IGNITION INTERNAL COMBUSTION ENGINE

William Arthur Weaver, Coventry, and Mervyn Hamilton-Fletcher, Studland, Dorset, England Application October 8, 1934, Serial No. 747,402
In Great Britain October 11, 1933

3 Claims. (Cl. 184—6)

This invention relates to internal combustion engines of the compression-ignition type.

The objects of the invention are to provide various constructional improvements which allow easy accessibility and detachability of working parts for cleaning and repair, which allow of the working parts being of heavy durable metal, whilst the non-working parts are of lighter metal, which allow of automatic temperature control of the lubricating oil, which allow of a "supercharger" effect being obtained without the use of a supercharger, and which allow of other advantages, such as compactness, rigidity and adaptability. The opposed setting of the cylinders tends to reduce vibration and "Diesel knock" but the construction is not limited to this form.

According to the invention, the improved compression-ignition type engines are characterized by the arrangement of the valve and pump operating gear in a separate detachable frame, superimposed upon the crankcase (which said crankcase may carry one or more cylinders as the case may be) and easily removable therefrom, so that such parts are readily accessible for cleaning, adjusting, etc., without disturbing other parts of the engine. This method of construction allows of these important working parts being made of steel or other strong and heavy metal, whilst the crankcase proper may be of a lighter metal such as aluminium or the like. This construction also permits of all moving parts being entirely enclosed and working in an oil bath.

This invention is also characterized by the arrangement of a water pump, in combination with the circulating pump for the lubricating oil, in such manner as to allow of the cooling water passing round the said oil pump for the purpose of keeping the lubricating oil at its correct working temperature. This arrangement of the pump further provides a ready means for attachment of and driving a second pump, as indicated, for auxiliary purposes. A further improvement consists in the attachment to the crankcase of a mechanically-operated valve of suitable dimensions, for the purpose of trapping a volume of air inside the crankcase in accordance with the movement of the pistons compressing the said air. This valve may be so arranged as to cause a super-charging effect by arranging the maximum air pressure at the moment of opening of the air intake valve in the combustion head. In some cases such valve may be automatic in action, but the mechanical method is preferred as being more positive. The interior of the crankcase is kept to small dimensions, and further is suitably disposed so as to permit of such super-charging by the movement of the opposed pistons to and from each other.

The engine preferably has a box-like construction of crankcase, all working parts being enclosed, but such parts being rendered easily accessible by quick release covers disposed thereon. Further, the said crankcase is of a box-like girder section, thus affording great strength and rigidity to the moving parts of the engine.

The invention is further characterized by a box-like crankcase of a light alloy into which are pressed sleeves or liners of a hard metal such as nitralloy steel, or high tensile iron, for the purpose of affording a hard working surface, for the movement of the pistons. Passages arranged in the case encircle the liners but are hermetically sealed at either end of such liners or sleeves, and are so arranged as to permit of a regular flow of cooling water or cooling air, if for air-cooling, for the purpose of maintaining the correct working temperature for such parts.

The invention is further characterized by a separate oil sump which can be cast of light alloy and which besides holding the required amount of lubricating oil allows water to circulate in integral cast jackets in order to cool its oil contents and also houses in a separate cast chamber an assembly in unit form comprising oil filter, oil filter emergency by-pass valve and oil pressure release valve which assembly can be withdrawn for inspection or adjustment without disturbing other parts and without releasing the oil contained in the sump.

In the accompanying drawings:—

Figure 1:
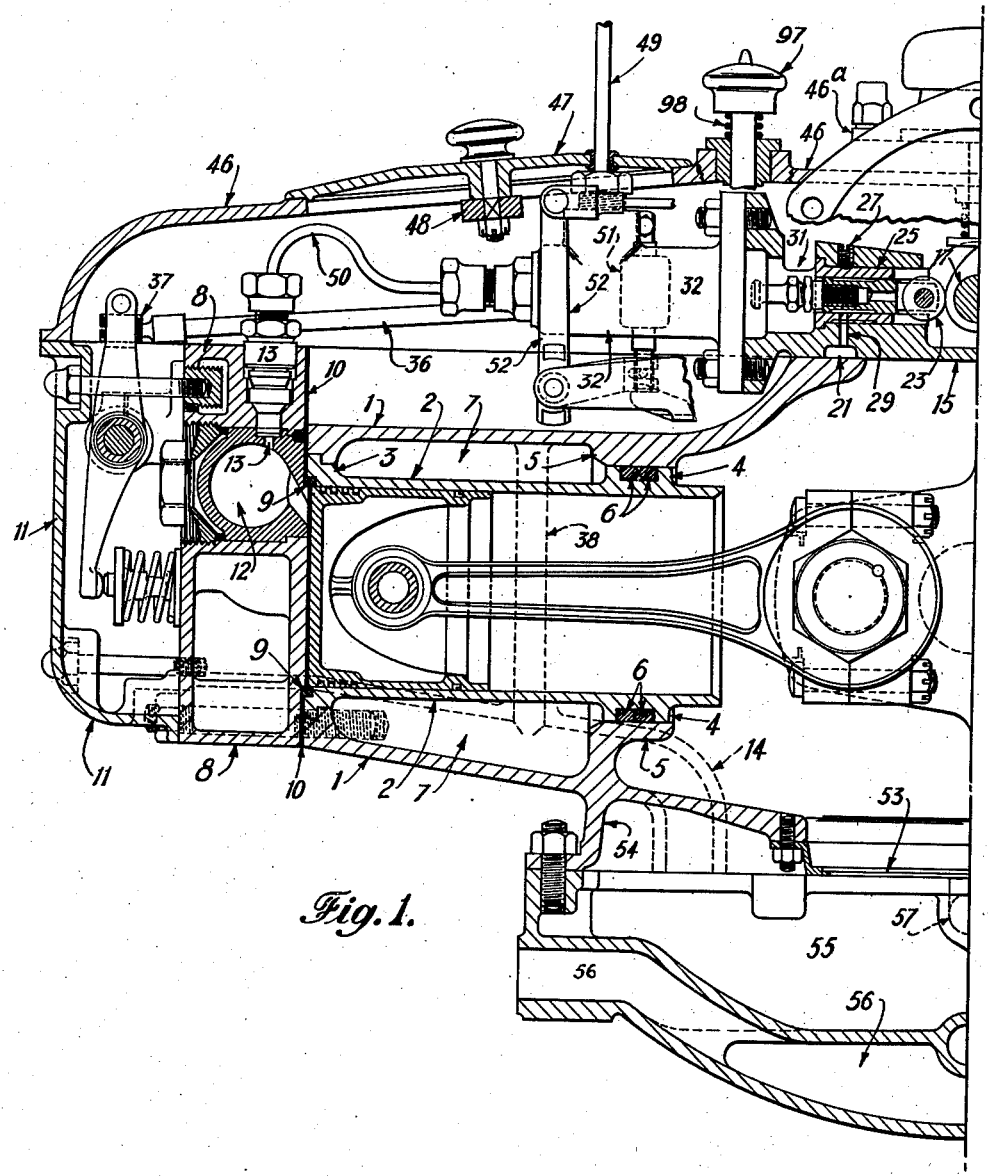
Figs. 1 and 1a are part sectional elevations of one example of engine made in accordance with the invention, the motion plate being shown in half section on two different planes, as shown on line 1—1 of Fig. 2.
Figure 1A:
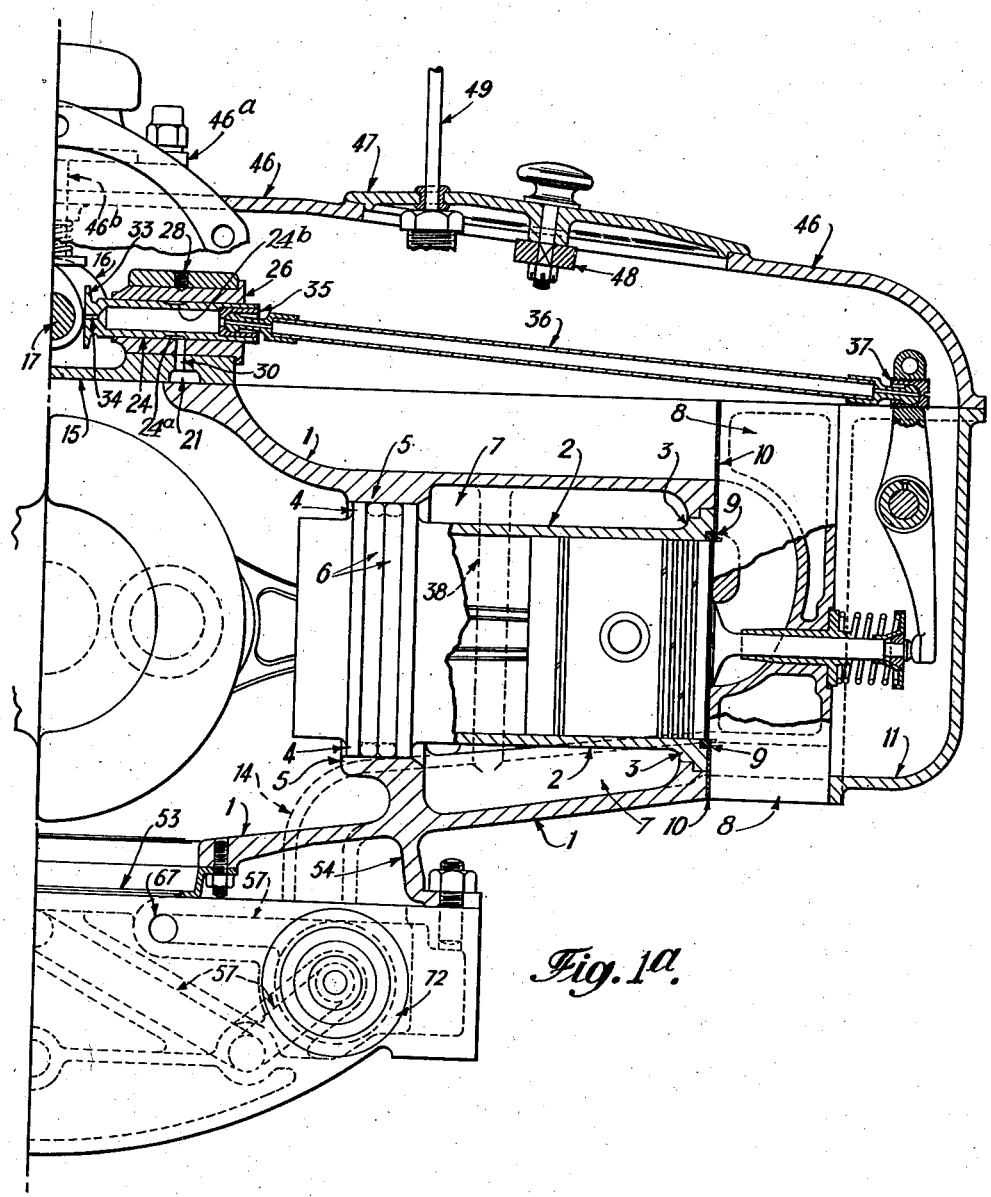

As illustrated, the engine is a two cylinder opposed horizontal engine, the main body comprising a crankcase 1 of aluminium and of rectangular box section. In each end of the crankcase is fitted a cylinder liner or sleeve 2 having a stepped flange 3 at its outer end and an annular grooved flange 4 near its inner end, which latter is made a close sliding fit in an annular rib or web 5 in the crankcase; a pair of rubber packing rings 6 being provided in the groove to make a watertight and air-tight joint while allowing for relative difference of longitudinal expansion between the cast iron or steel liner 2 and the aluminium crankcase. A space 7 is thereby formed around the sleeve for the circulation of cooling water. The sleeves 2 are each secured in position by a cylinder head 8 bolted to the end of the crankcase the security of the sleeve location and the joint being obtained by the combination of a non-yielding ring 9 partly recessed into the end of the sleeve and a gasket 10 of the usual construction. Each cylinder head is provided with an inlet valve and exhaust valve and rocker mechanism therefor, and also with a detachable cover plate 11 to enclose the working part. The cylinder head is also formed with suitable water cooling spaces and is fitted with a detachable combustion chamber 12 and fuel injector 13. An oil return duct 14 is provided in the lower wall of the crankcase and in the cylinder heads for the return of lubricating oil from the valve cover space to the sump, described later.

Figure 3:
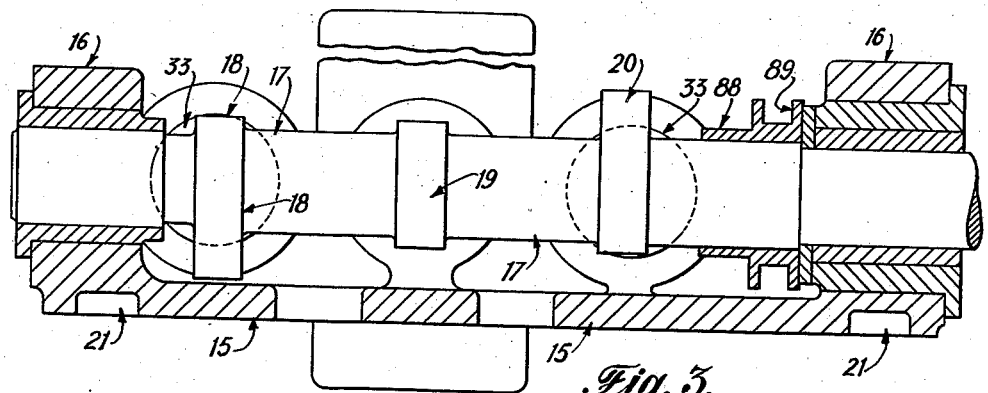
Fig. 3 is a sectional end elevation of Fig. 2 on line 3—3.
Figure 2:
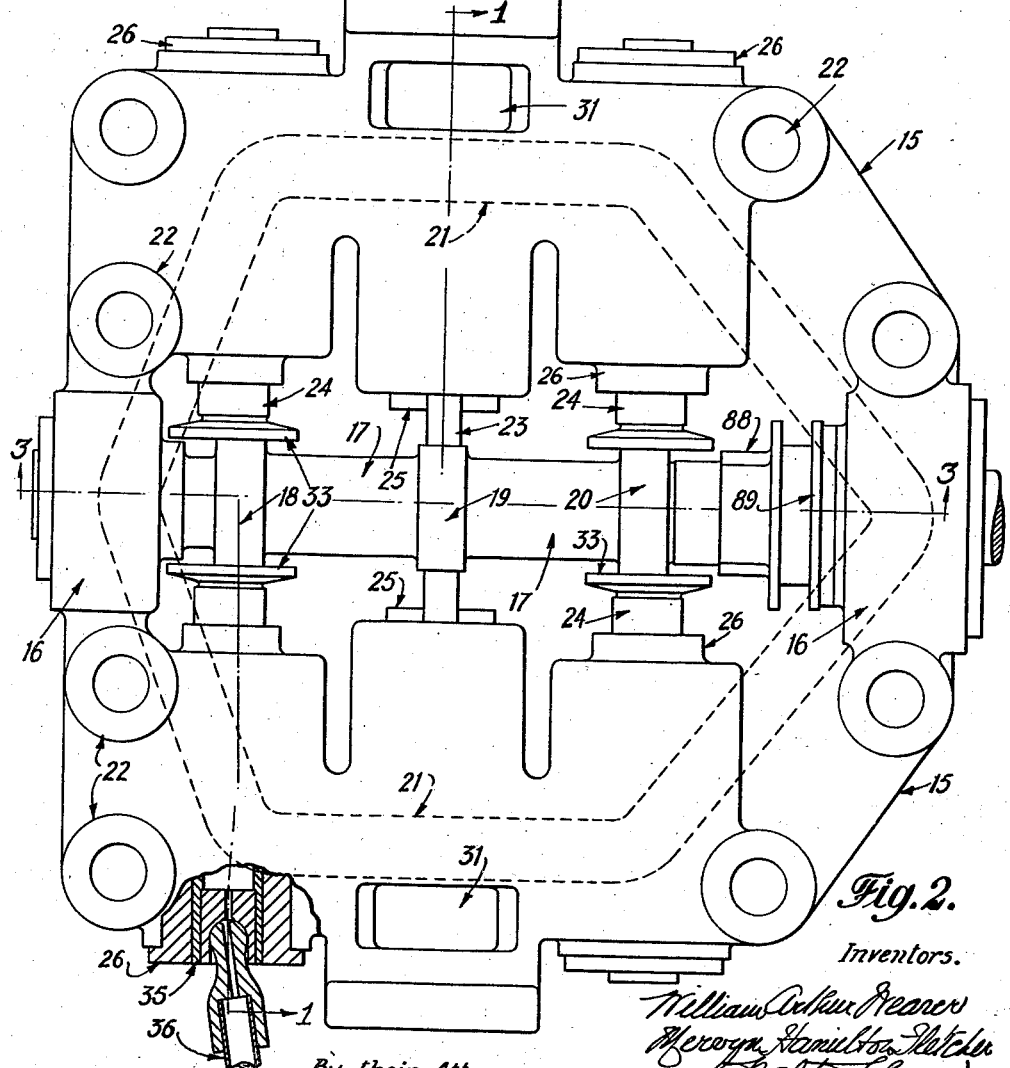
Fig. 2 is a plan of the motion plate.
Figure 4:
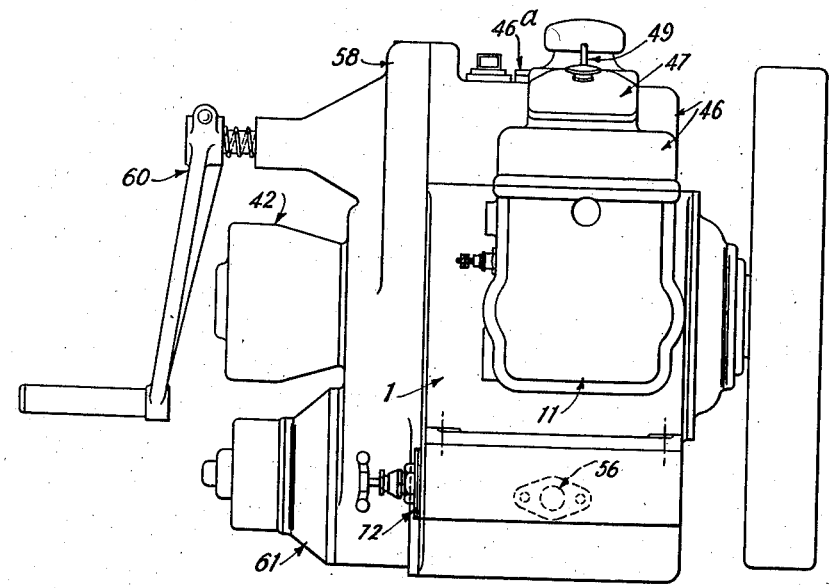
Fig. 4 is an external end view of the engine.

Above the centre part of the crankcase is secured a motion plate 15 (see Figs. 2 and 3), which is preferably of steel, or some stronger metal than the crankcase, having bearings 16 for a camshaft 17 which latter has an inlet cam 18, oil fuel pump cam 19 and exhaust cam 20. The motion plate is formed on its underside with a groove 21 which becomes an oil distribution duct, its open side lying against the upper surface of the crankcase. The plate is formed with holes 22 for holding down bolts and with pairs of horizontal cylindrical bosses in which are mounted respectively roller ended tappets 23 and hollow valve operating tappets 24. The bosses are fitted with tappet guide bushes 25 and 26 respectively fastened by set screws 27 and 28 which also serve to close the ends of drill holes forming oil ducts 29 and 30 which communicate with the groove 21. The tappets 24 have a circular groove 24a and hole 24b so that oil can pass from the duct 30 into the interior of the tappet. The centre of the motion plate forms an oil bath into which the cams dip as they rotate. The tappets 23 are adjustable through an aperture 31 in the boss behind the bush 25. The fuel oil pump 32, for which no special feature is claimed, is bolted to the rear end of the boss. The hollow tappets 24 have a flat head 33 to engage the cam, through which head is an oil hole 34 while at its other end the tappet has a hardened cup insertion 35, also formed with a central oil hole, and adapted to form a seating for the nose of a push rod 36, which is made tubular for strength and lightness and which construction is also used to conduct oil to the lower ball socket joint in the rocker, the socket 37 of which is adjustable for clearance adjustment in known manner. Lubricating oil from the lower ball socket joint falls into the space under the valve cover plate and returns by the duct 14 while a further duct 38, joining with the duct 14, serves to return surplus lubricating oil falling onto the upper part of the crankcase from the upper tappet ball and socket joints or from elsewhere, as by overflow from the cam oil bath.

Figure 12:
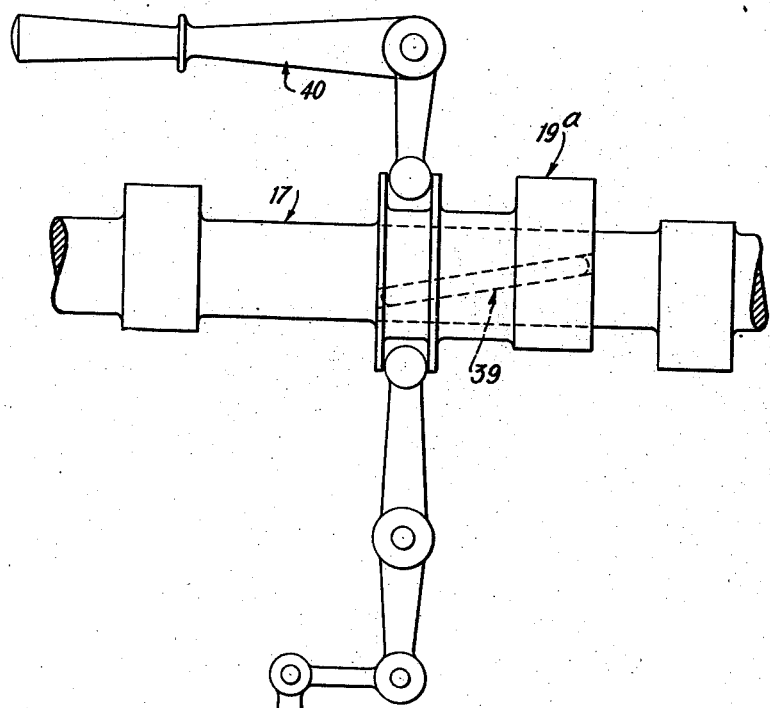
Fig. 12 is a detail of the governor assembly.
Figure 12:
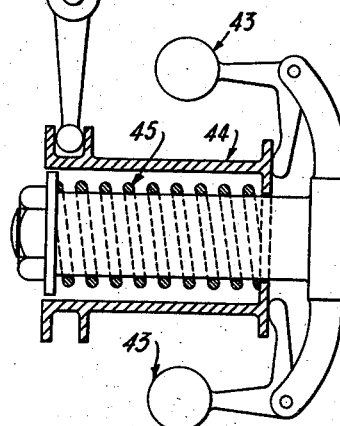

As shown in Fig. 12, the fuel oil pump cam 19a may be slidably mounted on the camshaft and by means of a spiral key and groove 39, provide for advancing or retarding the timing of the injection of fuel oil into the cylinders. The sliding of the cam may be effected by means of a lever 40 or through suitable link mechanism by a governor arranged within the housing 42 and consisting of fly-weights 43 acting to move a sleeve 44 on the governor shaft against the pressure of a spring 45. By this means, automatic advance of the timing is obtained.

A further cover 46 is provided over the top of the engine, covering in the motion plate and push rods, the cover joining up with the valve cover plates 11 of the cylinder heads. In the cover 46 are inspection covers 47 secured by central locking members 48. Centrally of the cover 46 is a cover 46a through which may be obtained inspection of the cams and access for adjustment of the pump tappets. This cover 46a may also be provided with an air inlet valve 46b adapted to engage a cam on the camshaft and operating to admit air to the crankcase so that it may be compressed therein and used for supercharging the engine.

The oil fuel supply pipes 49 leading to the fuel pumps pass through the covers which however can be raised and then swung round on their pipes. The fuel pumps are each connected by pipes 50 to their respective injectors 13 while their control valves 51, which provide the equivalent of a carburetter throttle for controlling the engine speed are operated by suitable levers 52.

The bottom of the crankcase is formed with an opening over which is secured a gauze filter 53, while on the bottom of the crankcase, around such opening is a flange 54 to which is secured an oil sump 55. The oil sump is formed with a cooling water jacket 56 and with various ducts 57, for the oil supply leading to a housing positioned towards one side and adapted to receive a filter unit (see Figs. 1 and 8). On one side of the engine is mounted a timing cover 58 which is bolted to flanges formed continuously on the crankcase, on the cover 46 and on the sump 55. On the front of the timing cover is a facing to which is bolted the pump unit and behind which is mounted a chain-sprocket wheel 59 adapted to be engaged by an extension of the driving shaft 59a of the pump gears. The sprocket 59 is mounted on a spigot 59b fixed in a lug on the face of the crankcase and is located thereon by an extension of a boss 58a on the inside of the timing cover. On the crankshaft are two chain sprocket wheels, one for the pump drive just described and the other for the camshaft drive. In the upper part of the timing cover is mounted the starting handle 60 adapted to be engaged with the camshaft while below the starting handle and co-axial with the crankshaft is a further seating for the governor unit. In place of the valve 46b previously described, an automatic flap valve may be provided in the timing case cover. In any case suitable ports will be provided to connect the crankcase space to the air inlet passages so that air compressed in the crankcase can be admitted to the engine and have the effect of a supercharger.

Figure 6:
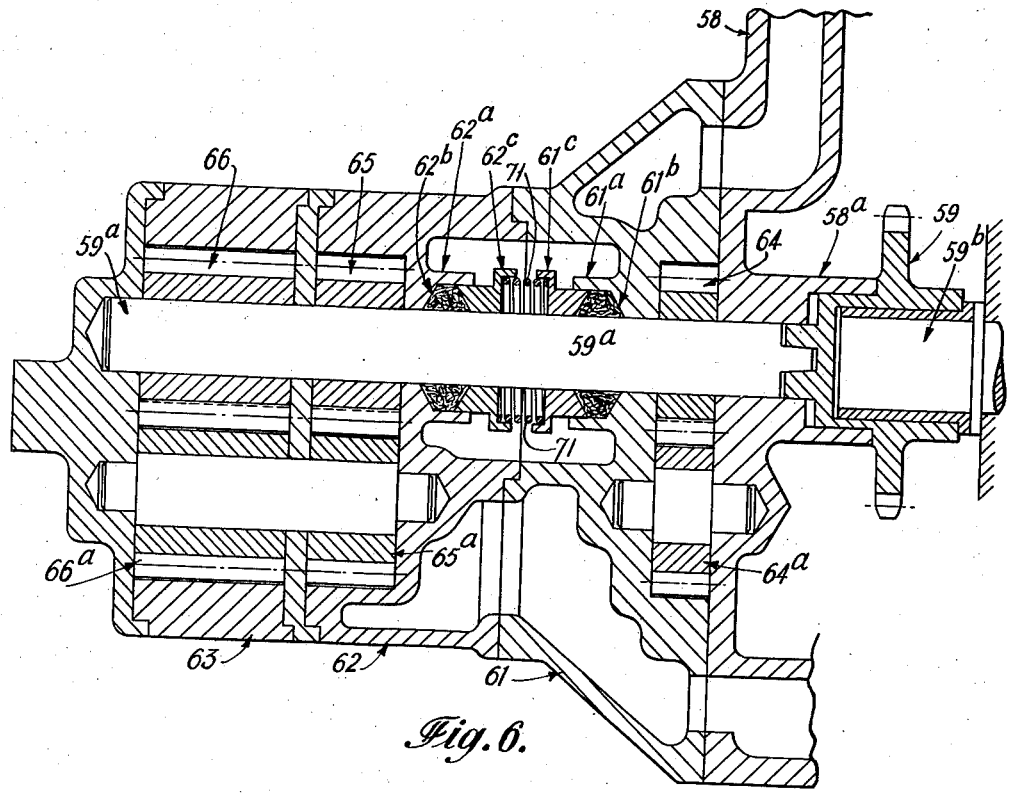
Figs. 6 and 7 are assembled sections at right angles of the combined oil pump and cooling water pump unit.
Figure 7:
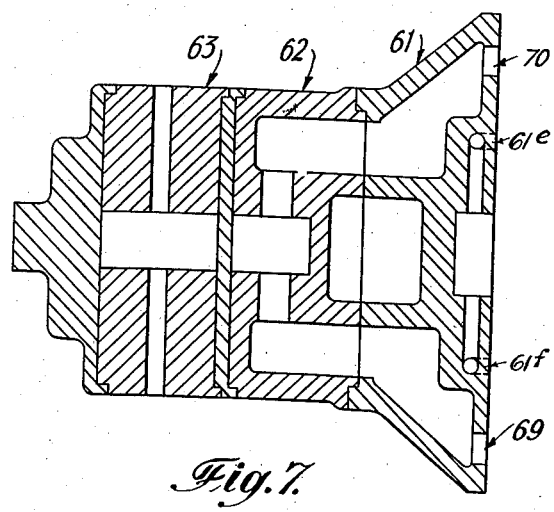

As shown in Figs. 6 and 7 the combined oil and water pumps unit is formed of three sections 61, 62 and 63, which fit together and are secured together and to the face of the timing cover by suitable bolts. A common driving shaft 59a is provided having pump pinions 64, 65 and 66 respectively arranged in the three sections, associated with which are the complementary pump pinions 64a, 65a, and 66a, the two latter having a common spindle. In the section 61 are inlet and outlet oil ducts 61e and 61f respectively which register with ducts in the facing of the timing cover, the inlet 61e communicating with the sump and the outlet 61f with a port 67 in the face of the sump from which the oil flows by one of the ducts 57 to the housing 68 in which is located the filter unit (see Figs. 1 and 8). In the section 61 and around the oil pump pinions are water spaces 69 and 70 forming inlet and outlet circulating water passages which register with ports in the section 62 leading to the water pump pinions therein. Between the sections 61 and 62 is a space around the common shaft 59a, in which space are bosses 61a and 62a for packings 61b and 62b and gland pressure members 61c and 62c, between which latter is a spring 71 to apply pressure to the gland members and make a self-adjusting packing gland. The pump pinions 66 and 66a are provided for use as a bilge pump for motor boat use and may otherwise be omitted.

Figure 8:
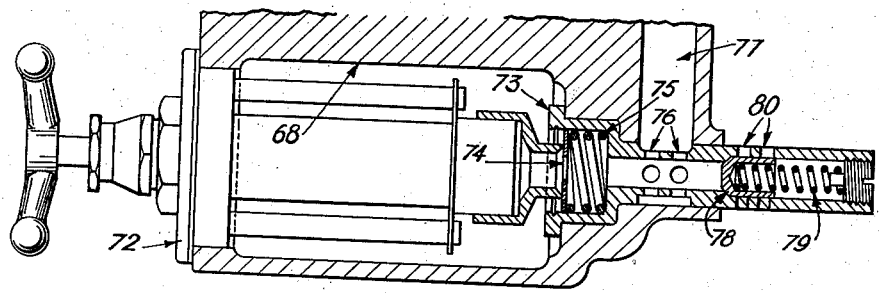
Fig. 8 is a sectional elevation of the oil filter.

As shown in Fig. 8, the oil filter 72 which is of the disc type, some of the discs being rotatable periodically for clearing, is mounted with its end projecting into the cupped end of a sleeve 73 in which is a washer 74 loaded by a spring 75 to rest against the end of the filter. The washer is a close sliding fit within the cup so that until a certain pressure is reached in the filter chamber, the oil will flow through the filter in normal manner. Should the oil filter become choked so as to restrict the oil flow seriously, the oil pressure will rise in the filter chamber and the washer will be forced back against the pressure of its spring, allowing oil to pass through to the engine oil ducts without passing through the filter. The sleeve 73 where it passes through the wall of the crankcase is formed with oil outlet openings 76 leading to the oil duct 77 in the crankcase, while in its end is accommodated a pressure release valve 78 and loading spring 79 controlling the release of oil through openings 80 to the sump.

Figure 5:
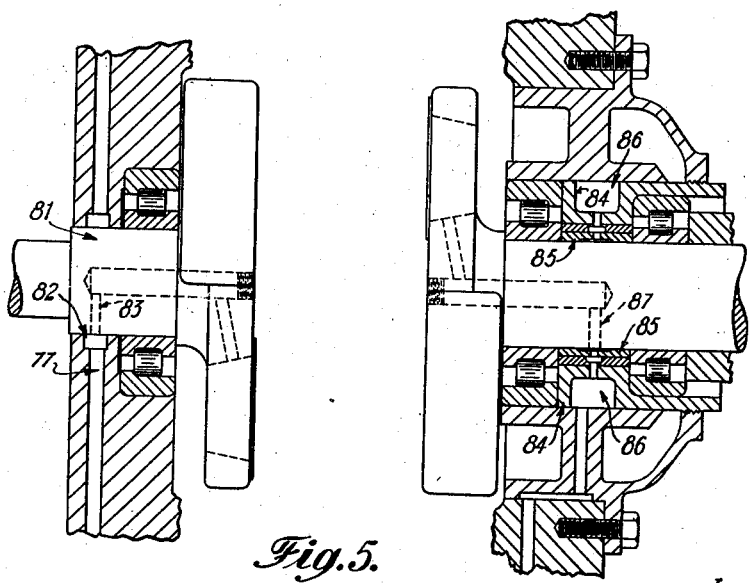
Fig. 5 is a part sectional elevation showing front and rear ends of the crankshaft and the forced feed lubrication systems thereat.

As shown in Fig. 5, pressure feed lubrication is provided by arranging in the one case the crankshaft spindle 81 as a close bearing fit in the crankcase in which is formed a groove 82 constituting part of the oil circulation system, the groove 82 joining the upper and lower parts of the oil duct 77. The upper part of the oil duct 77 leads to the oil duct 21. In the crankshaft spindle 81 is an oil duct 83 adapted to register with the groove and communicating through suitable oil passages which lead to the crank pin, not shown. At the other end of the crankshaft, and so as to accommodate 2 roller bearings, or a combination of one roller and one ball bearing, a sleeve 84 is provided having a further inner ring 85, through and between which is provided oil passages, to transmit oil under pressure from an oil groove 86 in the sleeve to the bearing races and also to a duct 87 in the crankshaft spindle by which oil under pressure may be supplied to the other crank pin.

Figure 9:
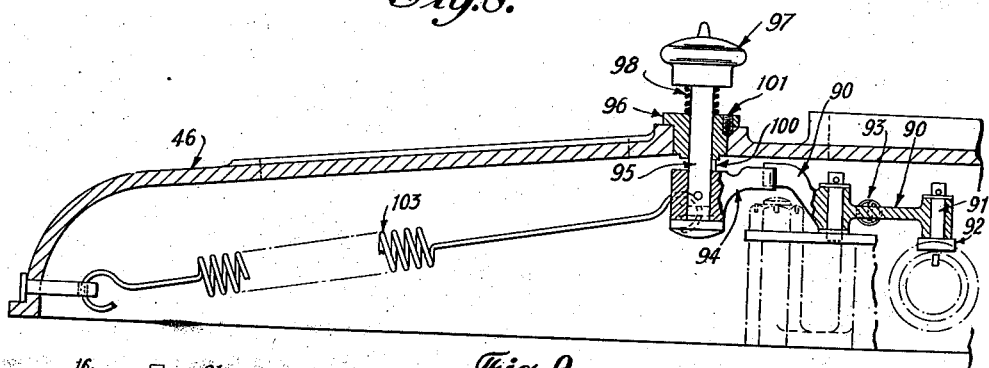
Figs. 9, 10 and 11 are part sectional elevation plan and detail sectional end view of the decompressor mechanism.
Figure 11:
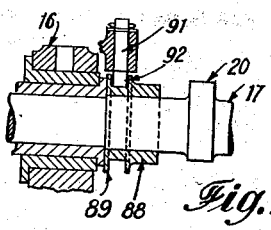
Figure 10:
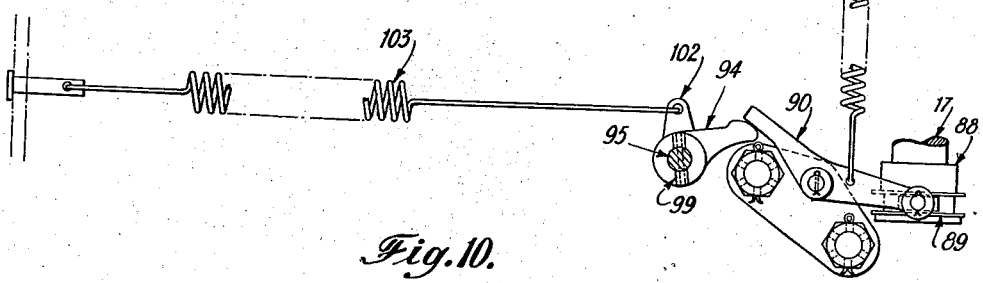

As shown in Figs. 9, 10 and 11, the decompressor mechanism comprises a sleeve 88 slidable on the camshaft and having an operating groove 89, the body of the sleeve being adapted to slide under the exhaust valve tappets to hold them raised after they have been raised by their cam. Beside the camshaft is pivoted a lever 90 having at one end a pin 91 with flat head 92 engaging the groove 89. A tension spring 93 is connected to the lever. At its other end the lever 90 is engaged by one arm 94 of a bell-crank lever mounted on the lower end of a spindle 95 which projects through a bush 96 in the engine cover and which is provided with a setting key 97, a spring 98 being provided tending to raise the spindle with the lever thereon. In the hub of the lever is formed a transverse slot 99 while on the bush is a pin 100 adapted to engage the said slot, the bush being suitably secured by a pin 101 against rotation. To the other arm 102 of the bellcrank lever is connected a tension spring 103. In operation the parts are normally positioned as shown, the spring 103 being stronger in its action than the spring 93 so that a stop (not shown) on the lever 90 rests against the wall of the motion plate or a stop thereon and there is no load on the actuating pin 91. For starting up, the setting key 97 is given a clockwise rotation to tension the spring 103, until the slot 99 registers with the pin 100 when the spindle rises under the action of the spring 98. The lever arm 94 will thereby have been withdrawn from engagement with the lever 90 and will remain in such position by the locking action of the slot 99 and pin 100. The tension spring 93 now moves the sleeve 88 towards the exhaust valve tappets under which it slides automatically as they are in turn lifted by rotation of the engine. The starting handle may now be rotated rapidly without the resistance of the engine compression until sufficient speed has been imparted to the flywheel, when a simple blow of the hand on the top of the key 97 releases the lever so that the arm 94 thereof immediately engages the lever 90 and the spring 103 operates to withdraw the sleeve 88 from under the exhaust tappets, whereupon the momentum of the flywheel will carry one of the pistons over the first compression stage and the engine will start.

The engine is suitable for use for an inboard or outboard motor boat engine or for a motor road vehicle or for a dynamo generator or for any purpose for which a high speed engine may be used. By providing anti-friction bearings the engine is easy to start and starting is facilitated in that the starting handle can be arranged on the half speed shaft, giving sufficient power for starting, and enabling starting speed to be more easily attained.

What we claim is:—

1. An internal combustion engine comprising a crankcase with a machined outer wall, and having passages within its wall for cooling liquid, an attached housing against the machined wall containing an oil-circulating pump and having passages for cooling liquid communicating with those in the crankcase wall, and a further attached housing connected to the first-named housing, containing a water-circulating pump, the entry and delivery ports of which communicate with the passages in the first-named housing, and having a single shaft for the oil circulating and water circulating pumps, said shaft connecting by tongue and groove with a member on the crankshaft in the crankcase, the crankcase and the first housing also having oil-circulating passages communicating with each other, those in the crankcase leading to an oil filter, to the crankshaft bearings, and to a motion plate mounted on the crankcase and carrying the valve-operating cam mechanism.

2. An internal combustion engine comprising a crankcase with a machined outer wall, and having passages within its wall for cooling liquid, an attached housing against the machined wall containing an oil-circulating pump and having passages for cooling liquid communicating with those in the crankcase wall, and a further attached housing connected to the first named housing, containing a water circulating pump, the entry and delivery ports of which communicate with the passages in the first named housing, and having a single shaft for the oil-circulating and water-circulating pumps, said shaft connecting by tongue and groove with a member on the crankshaft in the crankcase, the crankcase and the first housing also having oil circulating passages communicating with each other, those in the crankcase leading to an oil filter, to the crankshaft bearings, and to a motion plate mounted on the crankcase, and carrying the valve-operating cam mechanism, the motion plate having on its underside an endless oil-circulating groove, and having ducts leading from said groove to the camshaft bearings, to hollow tappets, and to the cams.

3. An internal combustion engine comprising a crankcase with a machined outer wall, and having passages within its wall for cooling liquid, an attached housing against the machined wall containing an oil-circulating pump and having passages for cooling liquid communicating with those in the crankcase wall, and a further attached housing connected to the first-named housing, containing a water-circulating pump, the entry and delivery ports of which communicate with the passages in the first named housing, and having a single shaft for the oil-circulating and water circulating pumps, said shaft connecting by tongue and groove with a member on the crankshaft in the crankcase, the crankcase and the first housing also having oil-circulating passages communicating with each other, those in the crankcase leading to an oil filter, to the crankshaft bearings, and to a motion plate mounted on the crankcase, and carrying the valve-operating cam mechanism, the motion plate having on its underside an endless oil-circulating groove and having ducts leading from said groove to the cam shaft bearings to hollow tappets and to the cams, the motion plate also having an oil well into which the cams dip and to which oil is supplied through the hollow tappets.

WILLIAM A. WEAVER.
M. HAMILTON-FLETCHER.